United States Patent [19]

White, Jr.

[11] Patent Number: 4,494,915

[45] Date of Patent: Jan. 22, 1985

[54] HYDROSTATIC STEERING UNIT WITH CYLINDRICAL SLIDE MEMBER WITHIN CLINDRICAL VALVE SLEEVE

[76] Inventor: Hollis N. White, Jr., 243 Pyle La., Hopkinsville, Ky. 42240

[21] Appl. No.: 317,501

[22] Filed: Nov. 2, 1981

Related U.S. Application Data

[63] Continuation-in-part of Ser. No. 51,508, Jun. 25, 1979, abandoned.

[51] Int. Cl.³ .............................. F04C 2/10; F15B 9/08
[52] U.S. Cl. .................................... 418/61 B; 60/384; 137/625.69
[58] Field of Search .............. 418/61 B; 60/384, 386; 91/375 R, 375 A; 137/625.69; 180/132

[56] References Cited

U.S. PATENT DOCUMENTS

| | | | |
|---|---|---|---|
| RE 25,291 | 12/1962 | Charlson | 418/61 B |
| 2,020,951 | 11/1935 | Lemon | 60/386 |
| 3,385,057 | 5/1968 | Pruvot et al. | 418/61 B |
| 3,438,200 | 4/1969 | Jennings et al. | 60/386 |
| 3,443,378 | 5/1969 | Monroe et al. | 418/61 B |
| 3,853,435 | 12/1974 | Ogasahara et al. | 418/61 B |
| 3,880,554 | 4/1975 | Termansen et al. | 418/61 B |
| 3,931,711 | 1/1976 | Rau et al. | 418/61 B |
| 3,937,601 | 2/1976 | Miller | 418/61 B |
| 3,957,129 | 5/1976 | Rau | 60/384 |
| 4,159,723 | 7/1979 | Baatrup et al. | 418/61 B |
| 4,354,350 | 10/1982 | Tischer et al. | 137/625.69 |

FOREIGN PATENT DOCUMENTS

1553287  4/1970  Fed. Rep. of Germany .... 418/61 B

*Primary Examiner*—John J. Vrablik
*Attorney, Agent, or Firm*—Woodling, Krost, Rust & Hochberg

[57] ABSTRACT

A hydrostatic steering unit is presented with axial spool valve actuation, and a gerotor set with valving in the rotor side face. The gerotor set comprises an orbiting gerotor displacement device with rotor valving, and with an input drive system directly to the gerotor device without driving through the valving, and also with an axially movable valve with a torsion member between the orbiting gerotor member and the input shaft.

18 Claims, 14 Drawing Figures

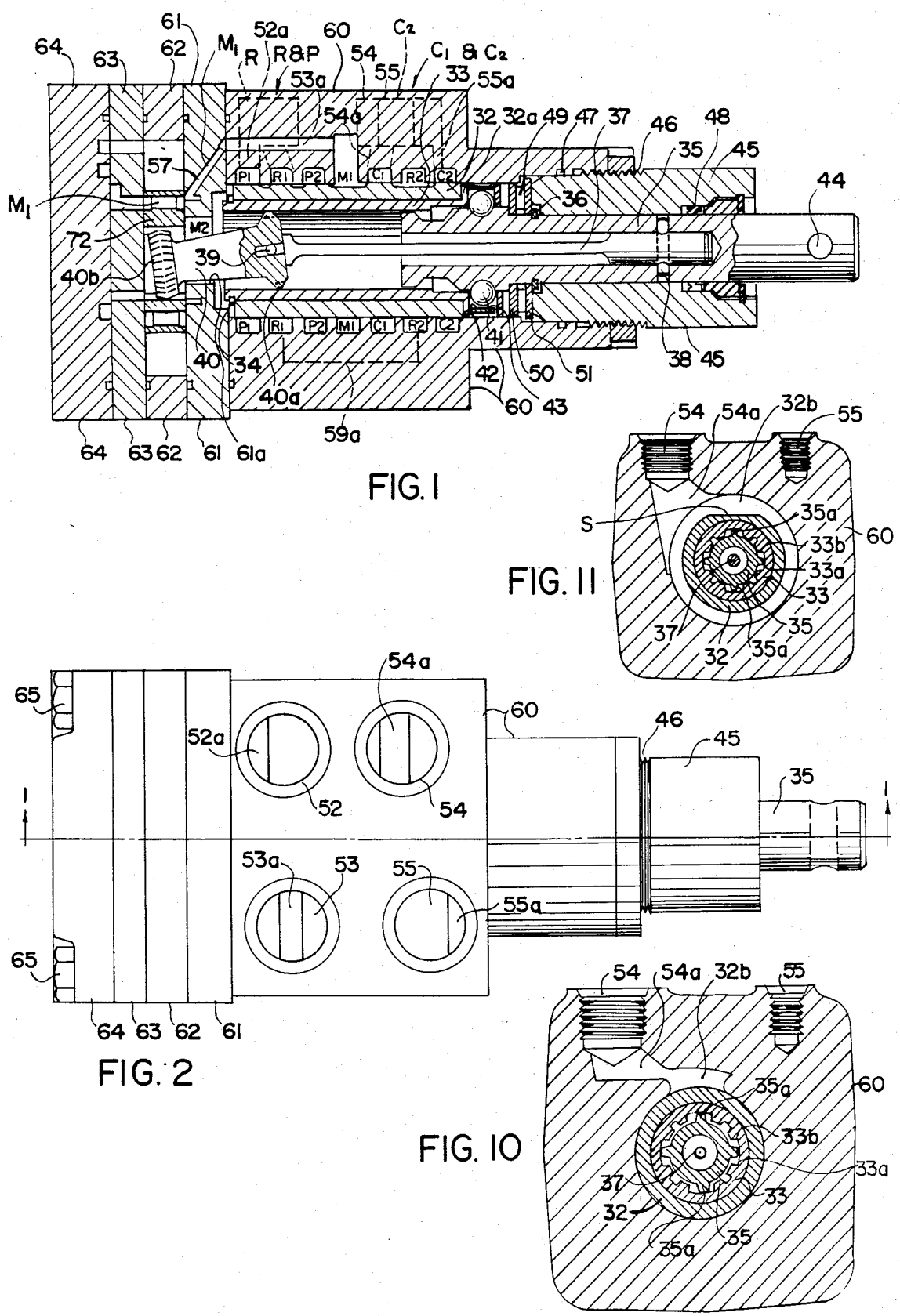

HYDROSTATIC STEERING UNIT WITH CYLINDRICAL SLIDE MEMBER WITHIN CLINDRICAL VALVE SLEEVE

This present application is a continuation-in-part of Mr. White's prior Hydrostatic Steering Unit application, Ser. No. 51,508, filed June 25, 1979, now abandoned.

This invention relates to an improvement on U.S. Pat. No. 3,452,543 granted July 1, 1969 to Raymon L. Goff and Hollis N. White, Jr. This earlier patent had a direct drive connection between the input drive shaft and the spool valve. The present invention has a cylindrical slide member closely inside the spool valve, which slide member is rotatable relative to the spool valve and the input drive shaft is directly connected to the slide member.

Other objects and advantages of the present invention will be apparent from the accompanying drawings and description and the essential features thereof will be set forth in the appended claims.

BRIEF DESCRIPTION OF THE DRAWINGS

FIG. 1 is a central sectional view through the hydrostatic steering device taken along the line 1—1 of FIG. 2.

FIG. 2 is a top plan view of the device shown in FIG. 1.

FIGS. 5, 6, 7 and 8 are sectional views taken along similarly numbered lines of FIG. 3, while

FIG. 10 is a sectional view like FIG. 5 but showing an alternative form where notch 32b does not extend circumferentially like C1.

FIG. 11 is a sectional view (like FIG. 5) of the disclosed form of the invention wherein the spool valve 32 has a series of staging grooves S cut into its outside surface, these staging grooves S extending less than 360° around the circumference of the spool valve 32.

DESCRIPTION OF PREFERRED EMBODIMENTS

Figure 3:
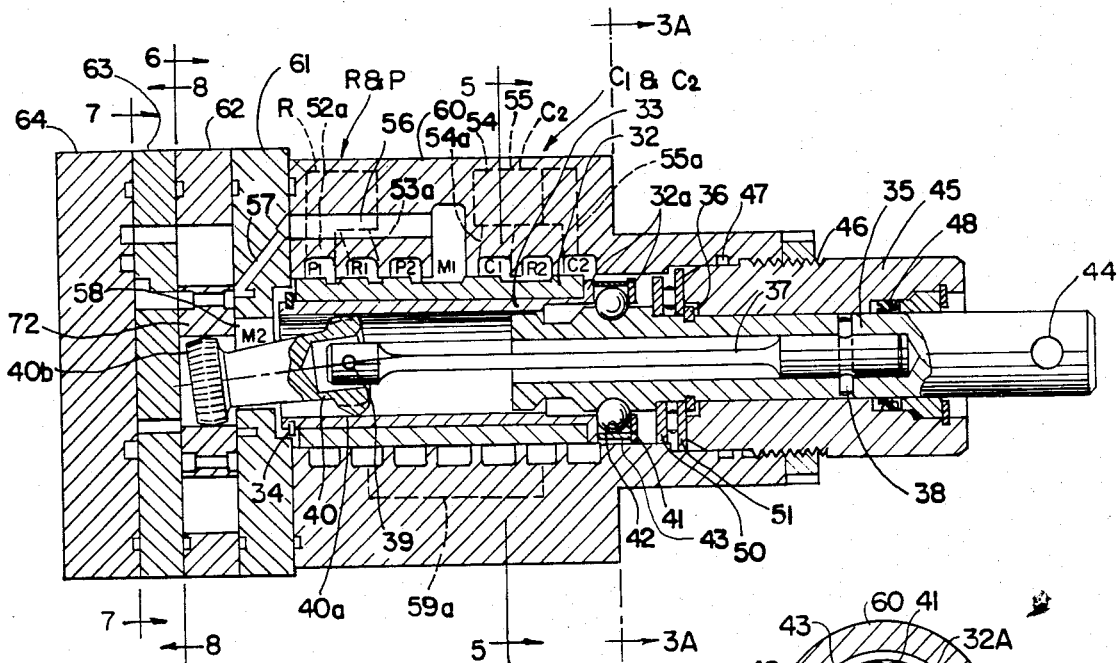
FIG. 3 is a view similar to FIG. 1 but showing the parts positioned to provide a right turn to the dirigible vehicle.

Referring now to FIG. 1, the hydrostatic steering device of this invention comprises a housing 60 to one end of which are fastened successively a wear plate 61, a gerotor set 62, a manifold 63 and an end cap 64. These parts are held together by bolts 65, shown in FIG. 2 which pass through all of the parts and hold them firmly assembled as shown in FIGS. 1 through 4.

The hydrostatic steering device comprises a generally cylindrical sleeve or spool valve 32 axially movable relative to a cylindrical bore in the center of the housing 60. Close fitting inside of the spool valve with a slight clearance, preferably between about 0.002 inches and 0.020 inches, is a slide member 33 which is rotatable inside of the sleeve spool valve 32. These two parts are arranged to move axially together which is accomplished by means of a radially outward projection 32a at one end of the sleeve valve and a snap ring 34 at the outer end of the slide member against which the sleeve valve abuts. Within the slide member is a drive shaft 35 oscillatably mounted in the housing 60 and secured against axial movement relative to the housing by a snap ring 36. Axially of the drive shaft 35, is a torsion bar 37 which is firmly fixed to the drive shaft by a pin 38 at one end, and at the other end it has a pivot connection 39 with a wobble stick 40 which has a spline connection at 40a with the slide member 33 and a spline connection at 40b with the rotor member 72 of the gerotor set 62. This torsion bar may be twisted a certain amount in a circumferential direction relative to the drive shaft 35 so that when the drive shaft is firmly held, the other end, connected with the wobble stick, will be permitted to oscillate a small amount as will later be described.

Figure 5:
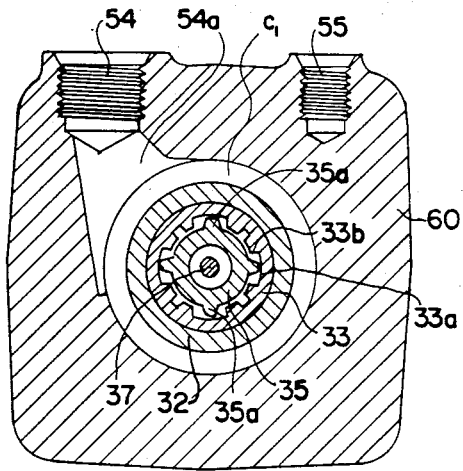

The connection between the drive shaft 35 and the slide member 33 is clearly seen in FIG. 5. On the drive shaft are a plurality of radially outwardly extending projections 35a, four such projections being shown spaced 90° apart, and these engage in recesses 33a in the slide member. These recesses are circumferentially of such an extent that they permit the movement of the projections 35a approximately 15° in each direction from the neutral position, shown in FIG. 5, after which oscillating movement, the projection 35a will strike one of the shoulders 33b at either end of a recess 33a.

Figure 3A:
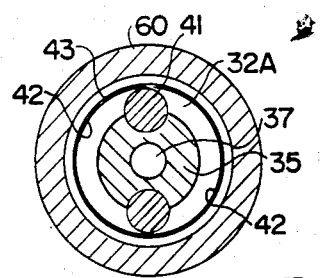
FIG. 3A is a sectional view along the line 3A—3A of FIG. 3.
Figure 4:
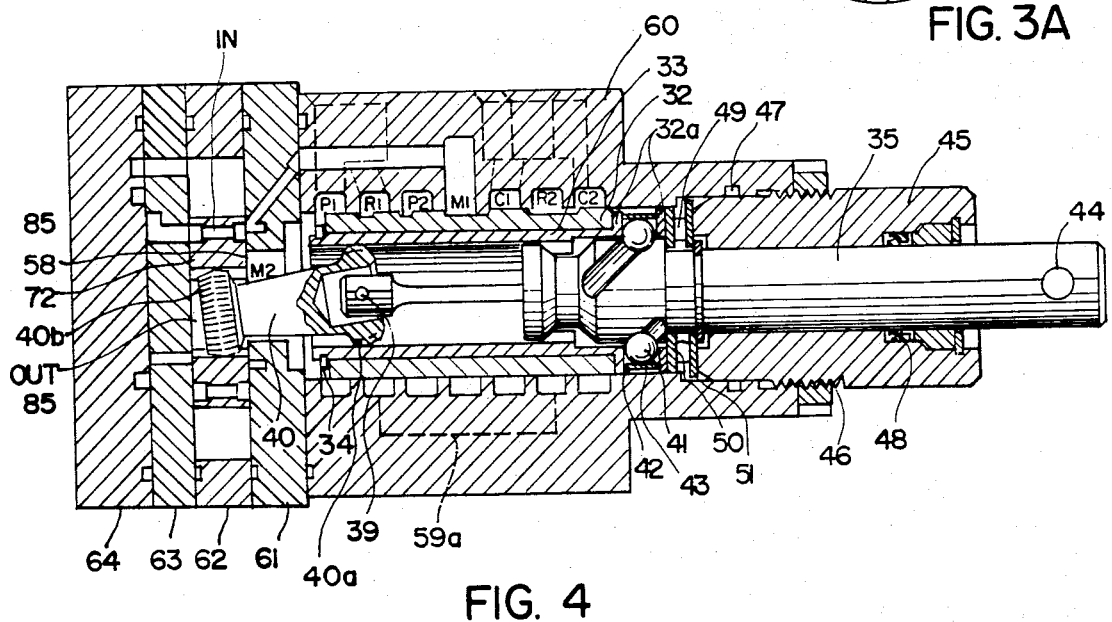
FIG. 4 is a view similar to FIG. 1 but showing the parts in position for a left turn of a dirigible vehicle.

Means is provided whereby oscillation of the drive shaft 35 will cause movement axially of the slide member 33 and the sleeve valve 32. This structure comprises a plurality of balls 41, carried in suitable recesses in the drive shaft 35 and the slide member 33, shown in FIG. 3A. These balls engage radially inwardly in short helical grooves 42 carried by the drive shaft 35. The balls are held against radial movement by the snap ring 43 on the outside and they engage against the projections 32a of the slide member in the horizontal direction. Thus, oscillation of the drive shaft 35 by a member attached at 44, will cause a small amount of axial movement of the sleeve valve 32 and the slide member 33 in either direction from the neutral position shown in FIG. 1. Such position is shown in FIG. 3 to cause a right turn of the dirigible vehicle. Such a position is shown in FIG. 4 to cause a left turn of the dirigible vehicle.

A sealing ring 45 is threaded into the housing 60 at 46 and fits closely between the housing and the drive shaft 35. A seal 47 is provided between the ring 45 and the housing 60 and another seal 48 is provided between the shaft 35 and the ring 45.

Thrust bearings 49 are provided between rings 50 and 51 to absorb any thrust toward the right as seen in FIG. 3.

A plurality of recesses are provided in the housing 60 in a row parallel to the axis of the drive shaft 35 and close to and opening toward the sleeve valve 32. These recesses are designated from left to right in FIGS. 1, 3 and 4 consecutively as P1, R1, P2, M1, C1, R2 and C2.

On the top of the housing 60 are four port openings 52, 53, 54 and 55 as seen in FIG. 2. As seen in FIG. 3, port 53, also designated as R, opens as shown at 53a into the recess R1. This is shown in dot-dash lines schematically in FIG. 3. Also, the port 52, as shown in dotted lines at 52a in FIG. 3, opens to the recess P1. The port 55 as shown schematically in dot-dash lines at 55a opens into recess C2. In like manner, the port 54, as shown in dotted lines at 54a, opens into the recess C1. The recess M1 opens radially outwardly and communicates through passageway 56 with passageway 57 in the wear plate 61. The central hollow opening at the left hand end of the sleeve valve 32 and the slide member 33 as seen in FIGS. 3 and 4, communicates with a central opening 58 in the wear plate 61 and is labeled also M2 in the drawings.

The recesses R1 and R2 are connected through the housing 60 by a passageway 59a shown in schematically in FIG. 3.

The gerotor gear set and servicing passages of this invention are shown in FIGS. 5, 6, 7 and 8. FIG. 3 is a central sectional view through the embodiment with the bearings and seals omitted for simplification of the drawings.

The wear plate 61 has a circular opening 61a which permits the necessary movement of the wobble stick 40 and at the same time forms part of the intake passageway M2 for fluid.

Figure 6:
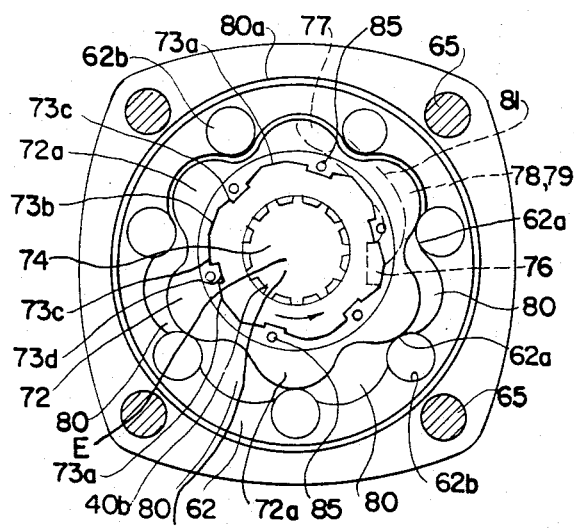

The gerotor 62 is best seen in FIG. 6. It comprises a stator 62 which has a plurality of internally extending teeth 62a, each including at its apex a cylindrical pin 62b. The rotor 72 is shown having a plurality of externally extending teeth 72a which are shaped to fittingly coact with the internally extending teeth 62a and these external teeth being one less in number than the internal teeth previously described. The rotor has an axis E which is eccentric relative to the axis F of the stator and the line G passing through points E and F is herein designated as the line of eccentricity. The rotor is provided with a generally annular ring 73 forming part of the intake passageway for fluid. This passageway is concentric around the axis E. Inside the annular ring 73 is a circular opening 74, also concentric, for the exhaust of fluid M1 from the rotary fluid pressure device. Six openings 85 are for inward flow of hydraulic fluid.

Figure 7:
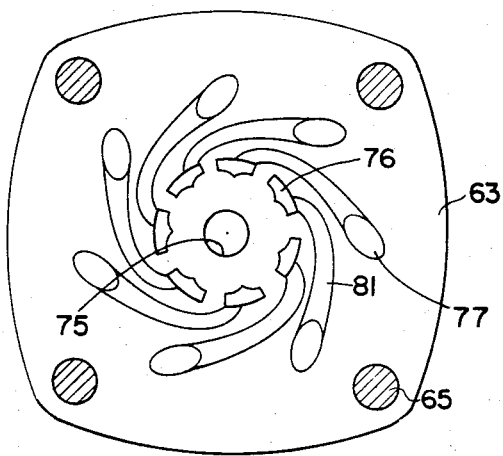
Figure 8:
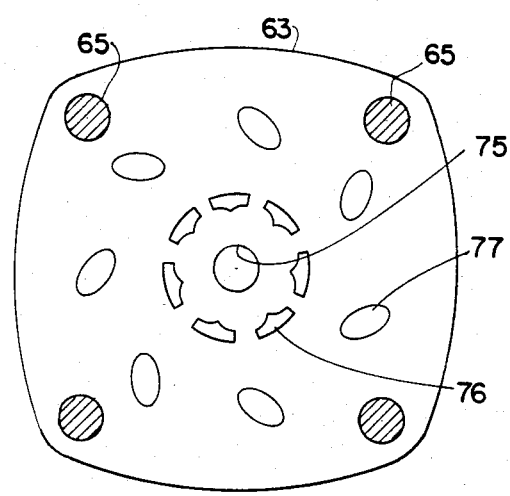

Referring now to FIGS. 6, 7 and 8, FIG. 8 shows the face of the manifold toward the gerotor structure 62, 72. Centrally there is the exhaust opening 75 which communicates with the exhaust opening. In the next circle and concentric, are seven rotor communicating openings 76, connectable with M2 and in an outer concentric circle are seven passageway openings 77 connected with M1 so positioned that they cooperate circumferentially with the cells 80 which are formed in changing fashion between the rotor and the stator as seen in FIG. 6.

FIG. 7 shows the face of the manifold 63 toward the end cap 64. This shows the through passageways 76 each connected to one of the openings 77 by means of angular passageways 78 and 79, each pair of which joins at an opening 79a.

The cooperation of these parts is shown in dot-dash lines in FIG. 6 at 81. This shows one of the openings 77 in position to cooperate with a cell 80a at the top of FIG. 6 and it is in cooperation through passageways 78 and 79, here shown diagrammatically, with one of the openings 76, which you might say is about two and one-half positions away going around the circle. It will now be seen how the radially outward openings 73a in the annular ring 73 cooperate with the communicating passageways 76. There are six of the formations 73a and each comprises a central, radially outermost portion 73b which extends substantially circumferentially and at each end of this outermost portion is a radially and circumferentially inwardly sloping portion 73d. Each of the passageways 76 is herein described as double trapezoidal in section. It will now be seen in FIG. 6 that when the dead pocket 80a at the top of FIG. 6 is in communication with its associated opening 77, then the other end of the connection through the 78, 79 connection and shown at 76 in dot-dash lines will illustrate how the exhaust pocket related to cell 80a is shut off before the fluid is transferred from the associated intake pocket 76. It will now be seen that the shape of each of the portions 73a of the annular ring 73 match fairly well with the radially outer edges of the double trapezoidal passageways 76.

It should now be apparent how the operation of this device as shown in FIGS. 6, 7 and 8 operates. Power is applied to the shaft 70 causing the rotor 72 to rotate in the stator 62 in the direction of the arrow shown in FIG. 6. The intake flow is from the inlet 66 through passageways 67 and 68, then through the hollow shaft portion 70a and through the central opening 61a in the wear plate. Then the flow is through passageways 82 and 83 to the annular passageways 84 which open toward the manifold 63. Then the flow passes through an opening to passageway 76 on one side of the eccentricity line G through the manifold passageways 78, 79 to one of the openings 77 which is in communication with one of the cells 80 between the rotor and stator. Meanwhile, one of the cells 80 on the other side of the eccentricity line G communicates back to the appropriate passageway 76 and back through the manifold 63 to the exhaust passageways 74, 75 and 85 to exhaust.

Figure 9:
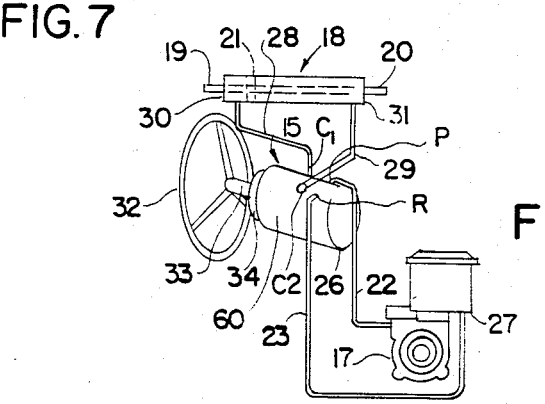
FIG. 9 is a schematic view of a power steering system for the dirigible vehicle which includes a hydrostatic steering device constructed according to the present invention.

In FIG. 9 there is shown a schematic drawing illustrating how the hydrostatic steering device of this invention may be connected up to a dirigible vehicle. The pressure fluid device shown in FIG. 9 is the hydrostatic steering device herein described in connection with FIGS. 1 through 4 and indicated in FIG. 9 with the reference 15. A power driven pump is shown at 17 with its associated reservoir of hydraulic fluid. A double acting cylinder 18 is shown for steering the vehicle, having a piston 21 and piston rods 19 and 20 at opposite ends of the cylinder which are intended to be connected to the right and left hand steering mechanisms of the vehicle. In operation, the power driven pump 17 has its high pressure connection at 24 communicating by line 22 to the port P which is the port 52 in the housing 60. The return port R, which is port 53 in housing 60, is connected by line 23 back to the low pressure discharge 27 coming back to the pump reservoir. The port C1 or 54 in the housing 60, is connected by line 28 to the end 30 of the cylinder 18. The port C2, or 55 in housing 60, is connected by line 29 to the end 31 of the cylinder 18. The steering wheel 32 has a shaft 33 which is connected to the drive shaft 35 of the hydrostatic steering device so that to provide a right hand turn, the parts of the hydrostatic steering device are moved to the position shown in FIG. 3, or to make a left turn, they are moved to position of the part shown in FIG. 4.

The description of this invention has included a specific gerotor set at 62, 72, but it should be understood that any suitable gerotor set might be used in this invention which creates a series of chamber increasing in size on one side of the line of eccentricity and other series of chambers decreasing in size on the opposite side of the line of eccentricity as described in connection with FIG. 6.

In the position of the parts in neutral position as shown in FIG. 1, it will be noted that the recesses P1 and P2 are in communication with the recess R1 so that no action of the hydrostatic steering device will take place.

In the position of the parts to make a right turn, as seen in FIG. 3, the drive shaft 35 has been oscillated to cause the balls 41 to move the sleeve valve 32 and the slide member 33 to the position shown in FIG. 3. In this position, the recess P2 is in communication with the recess M1 which communicates with an opening 77 as seen in FIGS. 7 and 8 while another opening 76, as seen in FIGS. 7 and 8, communicates with M2 which is in communication with recess C1 through piston 18, and which is in communication with recess R2 and thus returns to the pump reservoir. As the vehicle then turns towards the right, the gerotor set returns to neutral position and the drive shaft 35 returns to the neutral position of FIG. 1.

For a left hand turn, the steering wheel is turned at that direction which causes oscillation of the drive shaft 35 in the opposite direction to that which occurred in connection with FIG. 3 causing the balls 41 to drive the members 32 and 33 toward the right as viewed in FIG. 4. In this position of the parts, the recess P1 opens into M2 which communicates with one of the openings 76 of FIGS. 7 and 8 and at the same time, one of the openings 77 communicates with recess C1 and through piston 18 to recess C2 and so into recess R2 as seen in FIG. 4 which returns the hydraulic fluid back to the pump reservoir. Then, as the car makes the indicated turn, the gerotor set moves back toward neutral position and the parts of the hydraulic hydrostatic steering device return to the position of FIG. 1.

The staging grooves S in the spool valve 32 extend less than 360° around the circumference of the spool valve 32. This structure is shown in FIGS. 1, 3, 4 and 11.

Figure 12:
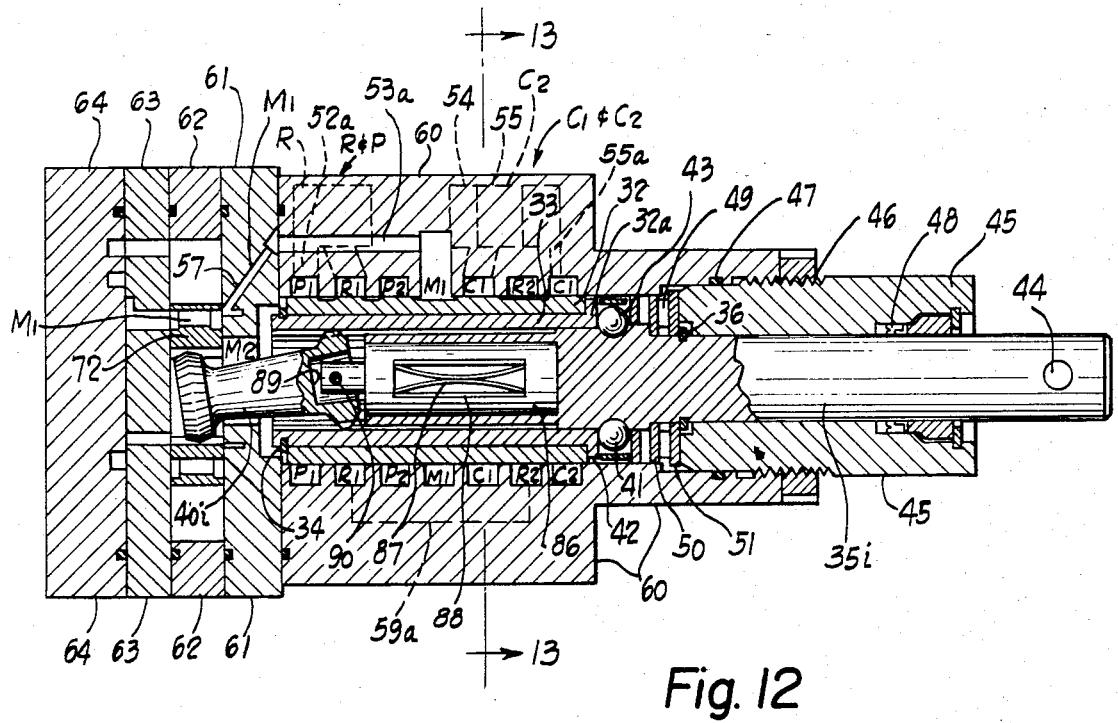
FIG. 12 is a central sectional view like FIG. 1 of an alternate hydrostatic steering device. This alternate embodiment has a compression spring torsion member instead of a torsion bar.
Figure 13:
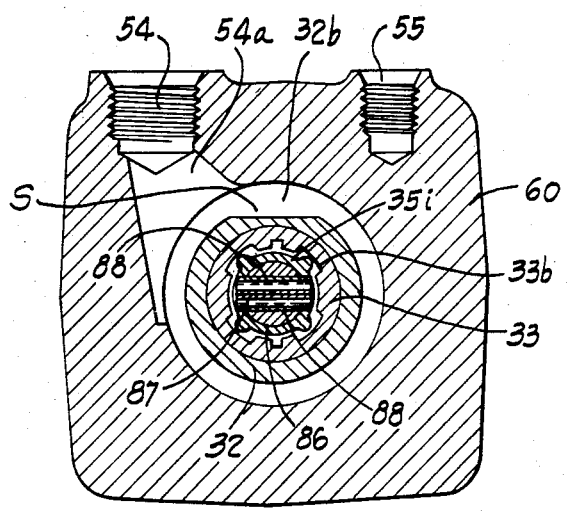
FIG. 13 is a sectional view of the alternate hydrostatic steering device of FIG. 12 taken generally along lines 13—13 of that figure.

FIGS. 12 and 13 disclose the invention of this application incorporated into an alternate hydrostatic steering device. This alternate embodiment uses a torsion cylinder 86 and compression springs 87 to replace the torsion bar 37 of the hydrostatic steering device of FIGS. 1 through 11.

In this alternate embodiment a torsion cylinder 86 is journaled into the wobble stick 40i end of the drive shaft 35i. The torsion cylinder 86 and the drive shaft 35i are both slotted. Two compression springs 87 are within the slots in the torsion cylinder 86 and the drive shaft 35i. Two flat plates 88 about the compression springs 87 insure the unfettered operation of this alternate torsion connection. An end of the torsion cylinder 86 extends beyond the drive shaft 35i. This end of the torsion cylinder 86 extends into a central opening 89 in the wobble stick 40i. A pin 90 drivedly connects the end of the torsion cylinder 86 to the wobble stick 40i.

The compression springs 87 serve as the torsion connection between the drive shaft 35i and the wobble stick 40i (through the torsion cylinder 86). These members may be twisted a certain amount relative to each other against the compression springs 87.

With this slight alteration the alternate embodiment of FIGS. 12 and 13 functions as does the torsion bar 37 hydrostatic steering device of FIGS. 1 through 11; the other parts of the hydrostatic steering device are identical.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a hydrostatic steering device having a rotatable drive shaft and an axially operated spool valve, an improved actuation means, said actuation means comprising a slide member, means to directly connect said slide member to the drive shaft for transforming the rotational motion of the drive shaft into axial movement of said slide member, and means to connect the spool valve to said slide member for transmitting axial motion of said slide member into axial motion of the spool valve, there being a clearance between the spool valve and said slide member allowing relative non-axial movement therebetween, with the result that rotational motion of the drive shaft is directly transformed into axial motion of the spool valve through said slide member.

2. The improved actuation means of claim 1 characterized in that said slide member is between the drive shaft and the spool valve.

3. The structure of claim 1 wherein the spool valve has a series of staging grooves on its outer circumference and characterized by the staging grooves extending less than 360° around the circumference of the spool valve.

4. In a hydrostatic steering device having a rotatable drive shaft and an axially operated cylindrical spool valve, an improved actuation means, said actuation means comprising a cylindrical slide member, said cylindrical slide member surrounding at least part of the drive shaft, helical means on one of the drive shaft and said cylindrical slide member, cooperating member means on the other of the drive shaft and said cylindrical slide member, said helical means and said cooperating member means cooperating to directly transform rotational movement of the drive shaft into axial movement of said cylindrical slide member, the cylindrical spool valve surrounding at least part of the cylindrical slide member and means to connect the cylindrical spool valve to said cylindrical slide member, said connection means transmitting axial motion of said cylindrical slide member into axial motion of the cylindrical spool valve, there being a clearance between the cylindrical spool valve and said cylindrical slide member allowing for relative non-axial movement therebetween, with the result that rotational movement of the drive shaft is directly transformed into axial movement of the cylindrical spool valve through said slide member.

5. The improved actuation means for claim 4 wherein the cylindrical spool valve has a series of staging grooves on its outer circumference and characterized by the staging grooves extending less than 360° around the circumference of the cylindrical spool valve.

6. The improved actuation means of claim 4 wherein the cylindrical spool valve rotates freely around said cylindrical slide member.

7. In a hydrostatic steering device having a rotatable drive shaft, an axially operated cylindrical spool valve and a gerotor gear set with a driven element, an improved actuation means comprising a cylindrical slide member, said cylindrical slide member surrounding at least part of the drive shaft, means for directly transforming rotational movement of the drive shaft into axial movement of said cylindrical slide member within a certain limited degree of rotation of the drive shaft in respect to said cylindrical slide member, the cylindrical spool valve surrounding at least part of said cylindrical slide member, there being a clearance between the cylindrical spool valve and said cylindrical slide member allowing for relative non-axial movement therebetween, means to connect said cylindrical slide member to the cylindrical spool valve for transmitting axial movement of said cylindrical slide member into axial movement of the cylindrical spool valve, a torsion connection, said torsion connection rotationally connecting the drive shaft with the driven element of the gerotor set within the certain limited degree of rotation of the drive shaft in respect to said cylindrical slide member, means for directly rotationally connecting the drive shaft with said cylindrical slide member after such certain limited degree of rotation of the drive shaft in respect to said cylindrical slide member and a driving connection between said cylindrical slide member and the driven element of the gerotor set, whereby within the certain limited degree of rotation of the drive shaft in respect to said cylindrical slide member the rotational movement of the drive shaft is transformed into axial movement of the cylindrical spool valve through said cylindrical slide member and the drive shaft is rotationally connected to the driven element of the gerotor set through said torsion connection and after the certain limited degree of rotation of the drive shaft in respect to said cylindrical slide member the drive shaft is rotationally connected to the driven element of the gerotor set through said cylindrical slide member.

8. In a hydrostatic steering device having a rotatable drive shaft, an axially operated cylindrical spool valve and a gerotor set with a driven element, an improved actuation means comprising a cylindrical slide member, said cylindrical slide member surrounding at least part of the drive shaft, helical means on one of the drive shaft and said cylindrical slide member, cooperating member means on the other of the drive shaft and said cylindrical slide member, said helical means and said cooperating member means cooperating to directly transform rotational movement of the drive shaft into axial movement of said cylindrical slide member within a certain limited degree of rotation of the drive shaft in respect to said cylindrical slide member, the cylindrical spoon valve surrounding at least part of the cylindrical slide member, there being a clearance between the cylindrical spoon valve and said cylindrical slide member allowing for relative non-axial movement therebetween, means to connect the cylindrical spoon valve to said cylindrical slide member, said connection means transmitting axial motion of said cylindrical slide member into axial motion of the cylindrical spool valve, a torsion connection, said torsion connection rotationally connecting the drive shaft with the driven element of the gerotor set within the certain limited degree of rotation of the drive shaft in respect to said cylindrical slide member, a lost motion type interconnection between the drive shaft and said cylindrical slide member, said lost motion type interconnection defining the certain limited degree of rotation of the drive shaft in respect to said cylindrical slide member, said lost motion type interconnection rotatably connecting the drive shaft with said cylindrical slide member at the limits of motion allowed by said lost motion type interconnection, and a driving connection between said cylindrical slide member and the driven element of the gerotor set, whereby within the certain limited degree of rotation of the drive shaft in respect to said cylindrical slide member the rotational movement of the drive shaft is transformed into axial movement of the cylindrical spoon valve through said cylindrical slide member and the drive shaft is rotationally connected to the driven element of the gerotor set through said torsion connection and after the certain limited degree of rotation of the drive shaft in respect to the cylindrical slide member the drive shaft is rotationally connected to the driven element of the gerotor set through said cylindrical slide member.

9. The hydrostatic device of claim 7 or 8 wherein the cylindrical spool valve has a series of staging grooves on its outer circumference and characterized in that the cylindrical spool valve is free to rotate in respect to said cylindrical slide member and the staging grooves extend less than 360° around the circumference of the cylindrical spool valve.

10. The hydrostatic steering device of claim 7 or 8 characterized in that said torsion connection is a torsion bar, said torsion bar connecting the drive shaft to the driven element of the gerotor set.

11. The hydrostatic steering device of claim 7 or 8 characterized in that said torsion connection is a compression spring, a torsion cylinder, said compression spring connecting the drive shaft to said torsion cylinder and said torsion cylinder drivedly connected to the driven element of the gerotor set.

12. In a hydrostatic steering device having a rotatable drive shaft and an axially operated spool valve, an improved actuation means, said actuation means comprising a slide member, ball and helical groove means to directly connect said slide member to the drive shaft for transforming the rotational motion of the drive shaft into axial movement of said slide member, and means to connect the spool valve to said slide member for transmitting axial motion of said slide member into axial motion of the spool valve, there being a clearance between the spool valve and said slide member allowing relative non-axial movement therebetween, with the result that rotational motion of the drive shaft is directly transformed into axial motion of the spool valve through said slide member.

13. In a hydrostatic steering device having a rotatable drive shaft, an axially operated spool valve and a pressure member drive, an imposed actuation means, said actuation means comprising a slide member, means to directly connect said slide member to the drive shaft for transforming rotational motion of the drive shaft into axial movement of said slide member up to substantially a certain point, means to directly connect said slide member to the drive shaft for transmitting rotational motion of the drive shaft into rotational movement of said slide member after substantially said certain point, means to connect the spool valve to said slide member for transmitting axial motion of said slide member into axial motion of the spool valve, there being a clearance between the spool valve and said slide member allowing relative non-axial movement therebetween and means to directly connect said slide member to the pressure member drive for transmitting rotational motion of the said slide member into rotational motion of the pressure member drive whereby up to said certain point the rotational motion of the drive shaft is directly transformed into axial motion of the spool valve through said slide member and after said certain point the rotational motion of the drive shaft is directly transmitted to the pressure member drive through said slide member.

14. In a hydrostatic steering device having a rotatable drive shaft, an axially operated cylindrical spool valve, a wobble stick, and a torsion connection between the drive shaft and the wobble stick, an improved actuation means, said actuation means comprising a cylindrical slide member, said cylindrical slide member surrounding at least part of the drive shaft, helical means on one of the drive shaft or said cylindrical slide member, cooperating member means on the other of the of the drive shaft or said cylindrical slide member, said helical means and cooperating member means cooperating to directly transform rotational movement of the drive shaft into axial movement of said cylindrical slide member up to substantially a certain point, a lost motion connection means, said lost motion connection means directly transmitting rotational movement of the drive shaft into rotational movement of said cylindrical slide member after substantially said certain point, the cylindrical spool valve surrounding at least part of said cylindrical slide member, means to connect the cylindrical spool valve to said cylindrical slide member for transmitting axial motion of said cylindrical slide member into axial motion of the cylindrical spool valve, there being a clearance between the cylindrical spool valve and said cylindrical slide member allowing relative non-axial movement, said cylindrical slide member surrounding at least part of the wobble stick, and means to rotationally correct the wobble stick to said cylindrical slide member for transmitting the rotational movement of said cylindrical slide member into rotational movement of the wobble stick whereby up to said certain point the rotational movement of the drive shaft is directly transformed into axial movement of the cylindrical spool valve through said cylindrical slide member, the torsion connection flexibly rotationally connecting the drive shaft with the wobble stick and after said certain point the rotational movement of the drive shaft is transmitted into rotational movement of the wobble stick through said cylindrical spool valve.

15. In a hydrostatic steering device having a rotatable drive shaft, an axially operated spool valve, and a pressure member drive, an improved actuation means, said actuation means comprising a slide member, means to directly connect said slide member to the drive shaft for transforming the rotational motion of the drive shaft into axial movement of said slide member, means to connect said slide member to the pressure member drive for common rotation therewith, and means to connect the spool valve to said slide member for transmitting axial motion of said slide member into axial motion of the spool valve, there being a clearance between the spool valve and said slide member allowing relative non-axial movement therebetween, with the result that rotational motion of the drive shaft is directly transformed into axial motion of the spool valve through said slide member.

16. In a hydrostatic steering device having a rotatable drive shaft, an axially operated cylindrical spool valve, and a pressure member drive, an improved actuation means, said actuation means comprising a cylindrical slide member, said cylindrical slide member surrounding at least part of the drive shaft, helical means on one of the drive shaft and said cylindrical slide member, cooperating member means on the other of the drive shaft and said cylindrical slide member, said helical means and said cooperating member means cooperating to directly transform rotational movement of the drive shaft into axial movement of said cylindrical slide member, means to connect said cylindrical slide member to the pressure member drive for common rotation therewith, the cylindrical spool valve surrounding at least part of the cylindrical slide member and means to connect the cylindrical spool valve to said cylindrical slide member, said connection means transmitting axial motion of said cylindrical slide member into axial motion of the cylindrical spool valve, there being a clearance between the cylindrical spool valve and said cylindrical slide member allowing for relative non-axial movement therebetween, with the result that rotational movement of the drive shaft is directly transformed into axial movement of the cylindrical spool valve through said slide member.

17. A hydrostatic steering device for controlling the operation of a pressure fluid operated steering member, comprising a housing having an inlet for pressurized fluid, an outlet for said pressurized fluid and two ports for connection to said steering member for driving the same selectively in opposite directions; a gerotor gear set in said housing including an internally toothed stator gear and a coacting externally toothed rotor gear eccentric to said stator gear and having one less tooth than said stator gear, relative rotative and orbiting movement between said rotor gear and said stator gear providing a series of expanding fluid chambers between said gears on one side of a line of eccentricity and a series of contracting fluid chambers between said gears on the other side of said line of eccentricity, a drive shaft extending through a major portion of said housing, means for said drive shaft to drive one of said rotor or said stator of said gerotor gear set, a cylindrical slide member in said housing surrounding said drive shaft, a generally cylindrical spool valve separate from said slide member and closely surrounding the same, said spool valve rotatable relative to said slide member, a plurality of recesses in said housing parallel to the axis of said drive shaft and closely surrounding said spool valve, some of said recesses communicating with said two ports respectively and with said inlet and outlet and with said expanding and contracting fluid chambers, helical grooves, operative interconnective pieces, one of said helical grooves or said operative interconnective pieces on one of said drive shaft or said slide member, the other of said helical grooves or said operative interconnective pieces on the other of said drive shaft or said slide member, said helical grooves and said operative interconnective pieces operatively connected, said operative connection translating rotational movement of said drive shaft into movement of said slide member axial of said drive shaft, a second operative connection between said slide member and said spool valve for moving said valve respectively to opposite sides of a neutral position responsive to the axial motion of said slide member, and passageway means in the housing and valve means on the outer surface of said spool valve for connecting said recesses in each of said respective positions on opposite sides of neutral position to drive said steering member in a selected direction, said valve means on the outer surface of said spool valve extending less than 360° around the circumference of said spool valve.

18. A hydrostatic steering device for controlling the operation of a pressure fluid operated steering member, comprising a housing having an inlet for pressurized fluid, an outlet for said pressurized fluid and two ports for connection to said steering member for driving the same selectively in opposite directions; a gerotor gear set in said housing including an internally toothed stator gear and a coacting externally toothed rotor gear eccentric to said stator gear and having one less tooth than said stator gear, relative rotative and orbiting movement between said rotor gear and said stator gear providing a series of expanding fluid chambers between said gears on one side of a line of eccentricity and a series of contracting fluid chambers between said gears on the other side of said line of eccentricity, a drive shaft extending through a major portion of said housing, means for said drive shaft to drive one of said rotor or said stator of said gerotor gear set, a cylindrical slide member in said housing surrounding said drive shaft, a generally cylindrical spool valve separate from said slide member and closely surrounding the same, said spool valve freely rotatable relative to said slide member, a plurality of recesses in said housing parallel to the axis of said drive shaft and closely surrounding said spool valve, some of said recesses communicating with said two ports respectively and with said inlet and outlet and with said expanding and contracting fluid chambers, helical grooves, operative interconnective pieces, one of said helical grooves or said operative interconnective pieces on one of said drive shaft or said slide member, the other of said helical grooves or said operative interconnective pieces on the other of said drive shaft or said slide member, said helical grooves and said operative interconnective pieces operatively connected, said operative connection translating rotational movement of said drive shaft directly into movement of said slide member axial of said drive shaft, a second operative connection between said slide member and said spool valve for moving said valve respectively to opposite side of a neutral position responsive to the axial motion of said slide member, passageway means in the housing and valve means on the outer surface of said spool valve for connecting said recesses in each of said respective positions on opposite sides of neutral position to drive said steering member in a selected direction and said valve means on the outer surface of said spool valve extending less than 360° around the circumference of said spool valve to provide for axial veneer adjustments and in combination with the rotation of said spool valve around said slide member the lubrication and cooling of the device by varied fluid path due to the everchanging path of least resistance about the spool valve.

* * * * *